US009214717B2

(12) United States Patent
Tudosoiu

(10) Patent No.: US 9,214,717 B2
(45) Date of Patent: Dec. 15, 2015

(54) HANDHELD ELECTRONIC DEVICES AND METHODS INVOLVING IMPROVED ANTENNA PERFORMANCE

(75) Inventor: Bogdan Ionut Tudosoiu, Hjarup (SE)

(73) Assignee: HTC CORPORATION, Taoyuan (TW)

(*) Notice: Subject to any disclaimer, the term of this patent is extended or adjusted under 35 U.S.C. 154(b) by 0 days.

(21) Appl. No.: 13/406,055

(22) Filed: Feb. 27, 2012

(65) Prior Publication Data

US 2013/0225250 A1 Aug. 29, 2013

(51) Int. Cl.
*H04M 1/00* (2006.01)
*H01Q 1/22* (2006.01)
*H01Q 21/28* (2006.01)

(52) U.S. Cl.
CPC ............. *H01Q 1/2266* (2013.01); *H01Q 21/28* (2013.01)

(58) Field of Classification Search
CPC ....... H01Q 1/2266; H01Q 1/243; H01Q 3/24; H01Q 21/28; H01Q 1/084; H01Q 1/242; H01Q 1/244; H01Q 1/245; H04B 1/3833; H04B 1/3838; H04B 1/385; H04B 1/3888; H04M 1/0214; H04M 1/0247; H04M 1/0237; H04M 1/0283; H04M 1/05; H04M 1/18; H04M 1/23; H04M 1/3833; H04M 1/6058
USPC .......... 455/575.1, 575.7, 550.1, 575.2, 575.3, 455/575.4, 575.5, 575.6
See application file for complete search history.

(56) References Cited

U.S. PATENT DOCUMENTS

2009/0295648 A1* 12/2009 Dorsey et al. ................ 343/702
2011/0312384 A1* 12/2011 Youn ............................ 455/566
2012/0071203 A1* 3/2012 Wong ......................... 455/550.1
2013/0156080 A1* 6/2013 Cheng et al. .................. 375/222

* cited by examiner

*Primary Examiner* — Marcos Torres
*Assistant Examiner* — Hung Du
(74) *Attorney, Agent, or Firm* — McClure, Qualey & Rodack, LLP

(57) ABSTRACT

Handheld electronic devices and methods involving improved antenna performance are provided. A representative device includes: a housing; a first antenna mounted at a first position of the housing; a second antenna mounted at a second position of the housing; a hand position monitoring system operative to determine a position of a hand of a user grasping the housing of the device; and an antenna selection system operative to selectively and alternately activate the first antenna and the second antenna such that, responsive to the hand position monitoring system determining that the hand is in a vicinity of the first antenna, the antenna selection system activates the second antenna, and responsive to the hand position monitoring system determining that the hand is in a vicinity of the second antenna, the antenna selection system activates the first antenna.

14 Claims, 5 Drawing Sheets

HANDHELD ELECTRONIC DEVICES AND METHODS INVOLVING IMPROVED ANTENNA PERFORMANCE

TECHNICAL FIELD

The present disclosure generally relates to handheld electronic devices.

BACKGROUND

Handheld electronic devices such as tablet computers have become prevalent. One reason for the proliferation of such devices is the increased display area. The increase in size has also lead users tending to grasp the devices with both hands. Unfortunately, the hands of the user can interfere with the antenna performance of a device that can lead to problems in wireless connectivity.

SUMMARY

Handheld electronic devices and methods involving improved antenna performance are provided. Briefly described, one embodiment, among others, is a handheld electronic device comprising: a housing; a first antenna mounted at a first position of the housing; a second antenna mounted at a second position of the housing; a hand position monitoring system operative to determine a position of a hand of a user grasping the housing of the device; and an antenna selection system operative to selectively and alternately activate the first antenna and the second antenna such that, responsive to the hand position monitoring system determining that the hand is in a vicinity of the first antenna, the antenna selection system activates the second antenna, and responsive to the hand position monitoring system determining that the hand is in a vicinity of the second antenna, the antenna selection system activates the first antenna.

Another embodiment is a method for improving antenna performance of a handheld electronic device having multiple antennas, the method comprising: using a position sensor to determine a position of a hand of a user of the device, the hand being used to grasp the device; and activating one of the antennas that does not correspond to the position of the hand.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
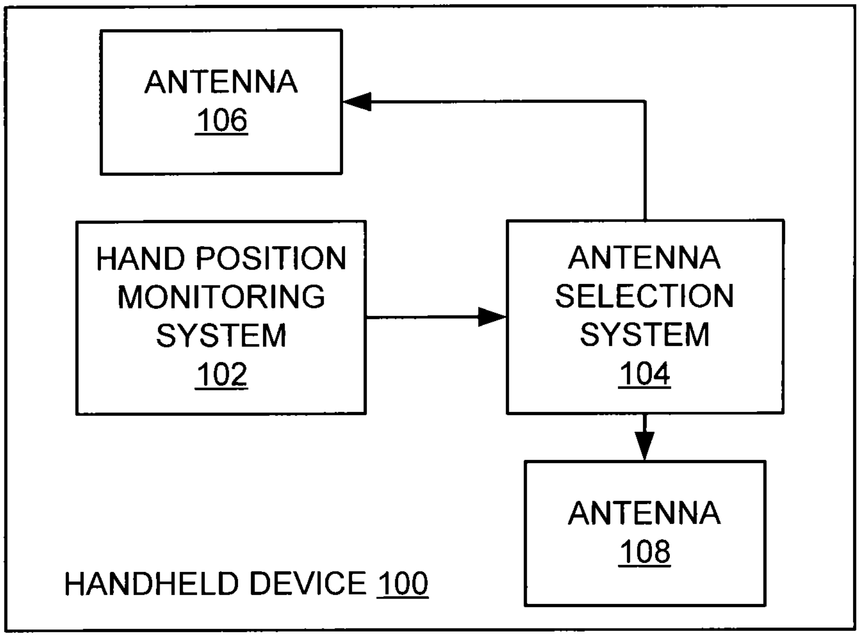
FIG. 1 is a schematic diagram depicting an example embodiment of a device involving improved antenna performance.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

Handheld electronic devices and methods involving improved antenna performance are provided. In some embodiments, a device is configured as a tablet computer that is of sufficient size to be grasped by two hands of a user. The device includes a monitoring system for determining the placement of at least one of the user's hands. Responsive to the determined position, the device selects an antenna for use (from among multiple antennas of the device) that is predicted to exhibit the least performance loss due to the hand positions.

In this regard, FIG. 1 is a schematic diagram depicting an example embodiment of a device involving improved antenna performance. As shown in FIG. 1, device 100 is a handheld electronic device (e.g., a tablet computer) that includes a hand position monitoring system 102, an antenna selection system 104 and antennas 106, 108. Notably, the antennas are separated from each other so that one or the other may not be covered by the hands of a user during use.

In operation, the hand position monitoring system determines the placement of at least one of the user's hands. For instance, in some embodiments, the monitoring system may incorporate a sensor (such as a pressure sensor, optical sensor, proximity sensor, G sensor) that is positioned in a vicinity of one of the antennas. First, if an increase in pressure is sensed by the sensor, indicating the possible presence of a user's hand, the antenna selection system may select the other antenna (which is presumably not near the hand) for use. Second, if light is blocked or a sensor is covered by a user's hand, indicating that the hand is approaching the antenna, the antenna selection system may select the other antenna (which is presumably not near the hand) for use. In other embodiments, various other configurations and algorithms may be used for driving the selection of an antenna.

Figure 2:
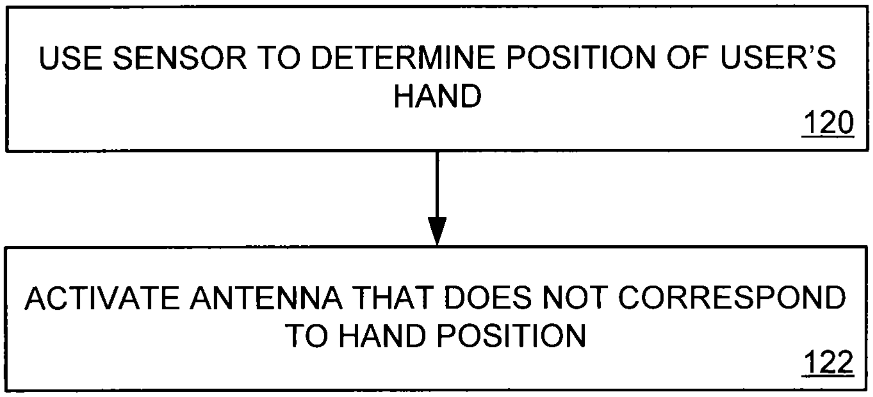
FIG. 2 is a flowchart depicting an example embodiment of a method involving improved antenna performance.

FIG. 2 is a flowchart depicting an example embodiment of a method involving improved antenna performance, such as may be performed by the device of FIG. 1. As shown in FIG. 2, the method may be construed as beginning at block 120, in which a sensor is used to determine the position of at least one hand of a user of a device. Then, as depicted in block 122, an antenna (among multiple antennas of the device) that does not correspond to a sensed hand position is activated for use by the device. In some embodiments, this may involve actuating a switch to connect the desired antenna to a transceiver of the device.

Figure 3:
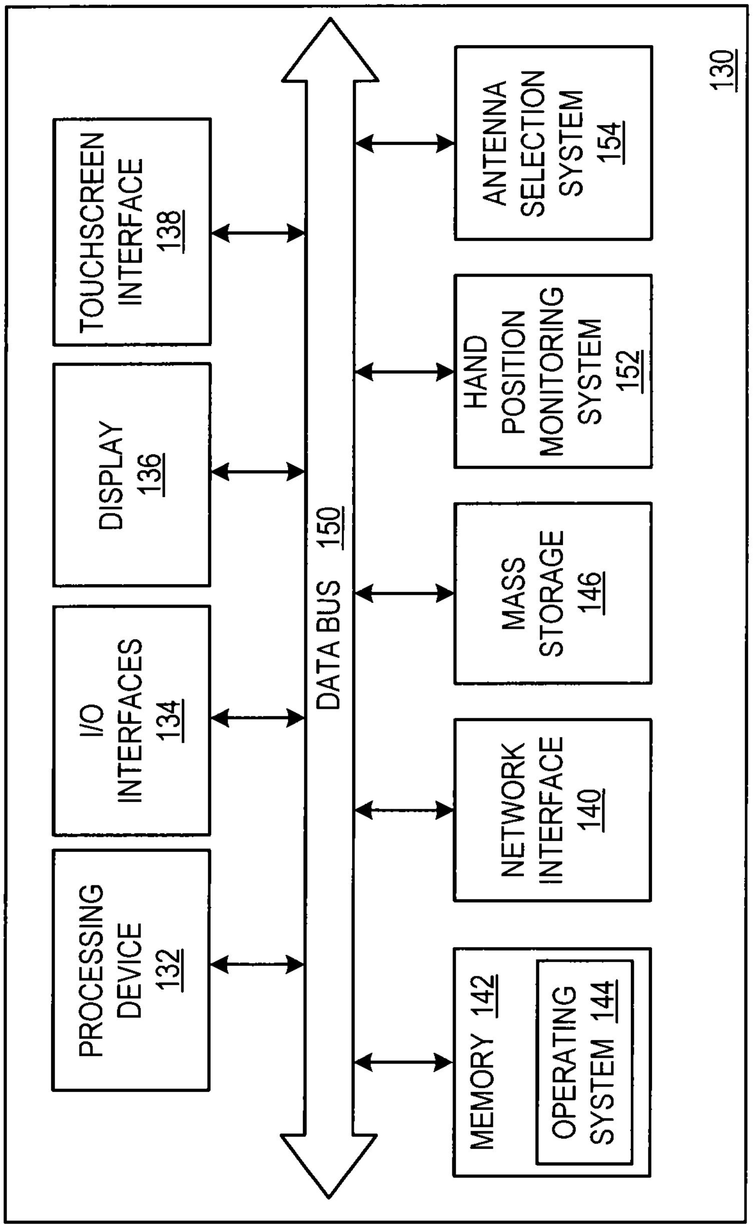
FIG. 3 is a schematic diagram depicting another example embodiment of a device.

FIG. 3 is a schematic diagram depicting another embodiment of a handheld electronic device. As shown in FIG. 3, device 130 includes a processing device (processor) 132, input/output interfaces 134, a display 136, a touchscreen interface 138, a network interface 140, a memory 142, an operating system 144, and a mass storage 146, each communicating across a local data bus 150. Additionally, device 130 incorporates a hand position monitoring system 152, which may include one or more sensors (not shown), and an antenna selection system 154.

The processing device 132 may include any custom made or commercially available processor, a central processing unit (CPU) or an auxiliary processor among several processors associated with the device 130, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 142 can include any one of a combination of volatile memory elements (e.g., random-access memory (RAM, such as DRAM, and SRAM, etc.)) and nonvolatile memory elements. The memory typically comprises native operating system 144, one or more native applications, emulation systems, or emulated applications for any of a variety of operating systems and/or emulated hardware platforms, emulated operating systems, etc. For example, the applications may include application specific software which may comprise some or all the components of the device. In accordance with such embodiments, the components are stored in memory and executed by the processing device. Note that although depicted separately in FIG. 2, hand position monitoring system 152 and antenna selection system 154 may be resident in memory such as memory 142.

Touchscreen interface 138 is configured to detect contact within the display area of the display 136 and provides such functionality as on-screen buttons, menus, keyboards, soft-keys, etc. that allows users to navigate user interfaces by touch.

One of ordinary skill in the art will appreciate that the memory can, and typically will, comprise other components which have been omitted for purposes of brevity. Note that in the context of this disclosure, a non-transitory computer-readable medium stores one or more programs for use by or in connection with an instruction execution system, apparatus, or device.

Network interface device 140 comprises various components used to transmit and/or receive data over a networked environment. When such components are embodied as an application, the one or more components may be stored on a non-transitory computer-readable medium and executed by the processing device.

With respect to hand position monitoring system 152, the functionality involved with this system generally involves determining a position of a user's hand. Responsive to the determined position, the antenna selection system 154 activates an antenna for use that is in a position which does not correspond to the determined hand position.

It should be noted that various functionality associated with the antenna selection system and the hand position monitoring system may be implemented by hardware, software or combinations thereof. As mentioned above, this functionality may involve determining the placement of at least one of the user's hands and selecting an antenna that is farthest from the detected hand for use.

If embodied in software, it should be noted that each block depicted in the flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as device 130. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

Figure 4:
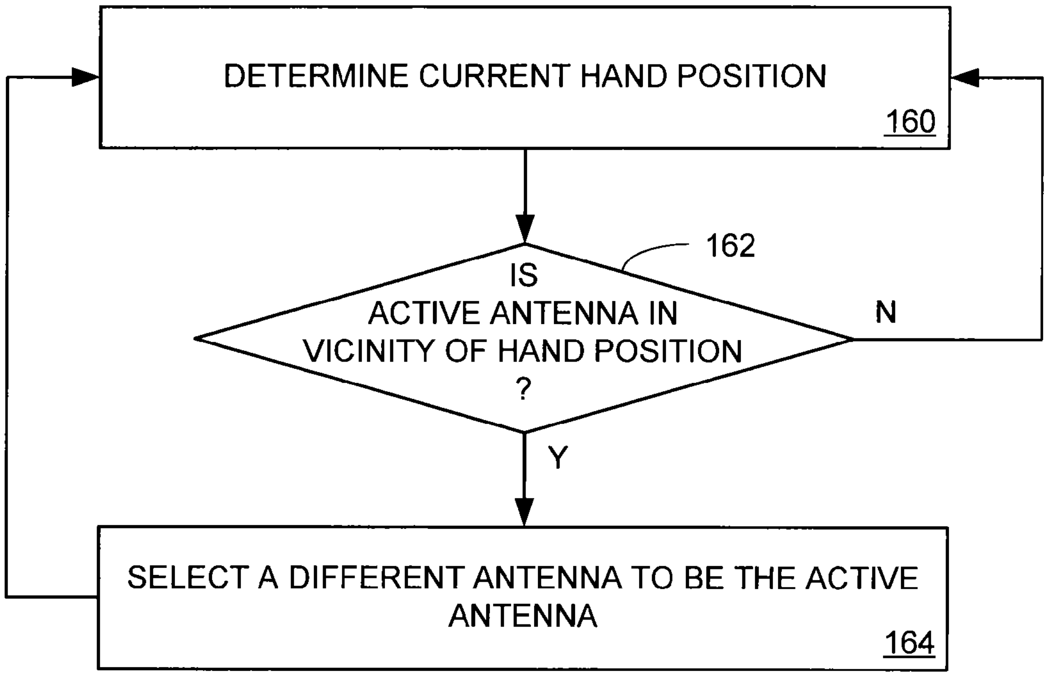
FIG. 4 is a flowchart depicting another example embodiment of a method.

In this regard, FIG. 4 is a flowchart depicting another example embodiment of a method, such as may be implemented by device 130, for example. As shown in FIG. 4, the method may be construed as beginning at block 160, in which a current hand position is determined. In some embodiments, this may involve the use of one or more sensors positioned at various locations of a device. Then, as depicted in block 162, a determination is made as to whether the active antenna of the device is in a vicinity of the determined hand position. For instance, in some embodiments, the antenna closest to the determined hand position may be considered in the vicinity of the user's hand. If it is determined that the active antenna is in the vicinity of the user's hand, the process may proceed to block 164, in which a different antenna of the device is selected to be the active antenna. However, if it is determined that the active antenna is not in a vicinity of the user's hand, the process may return to block 160.

Figure 5:
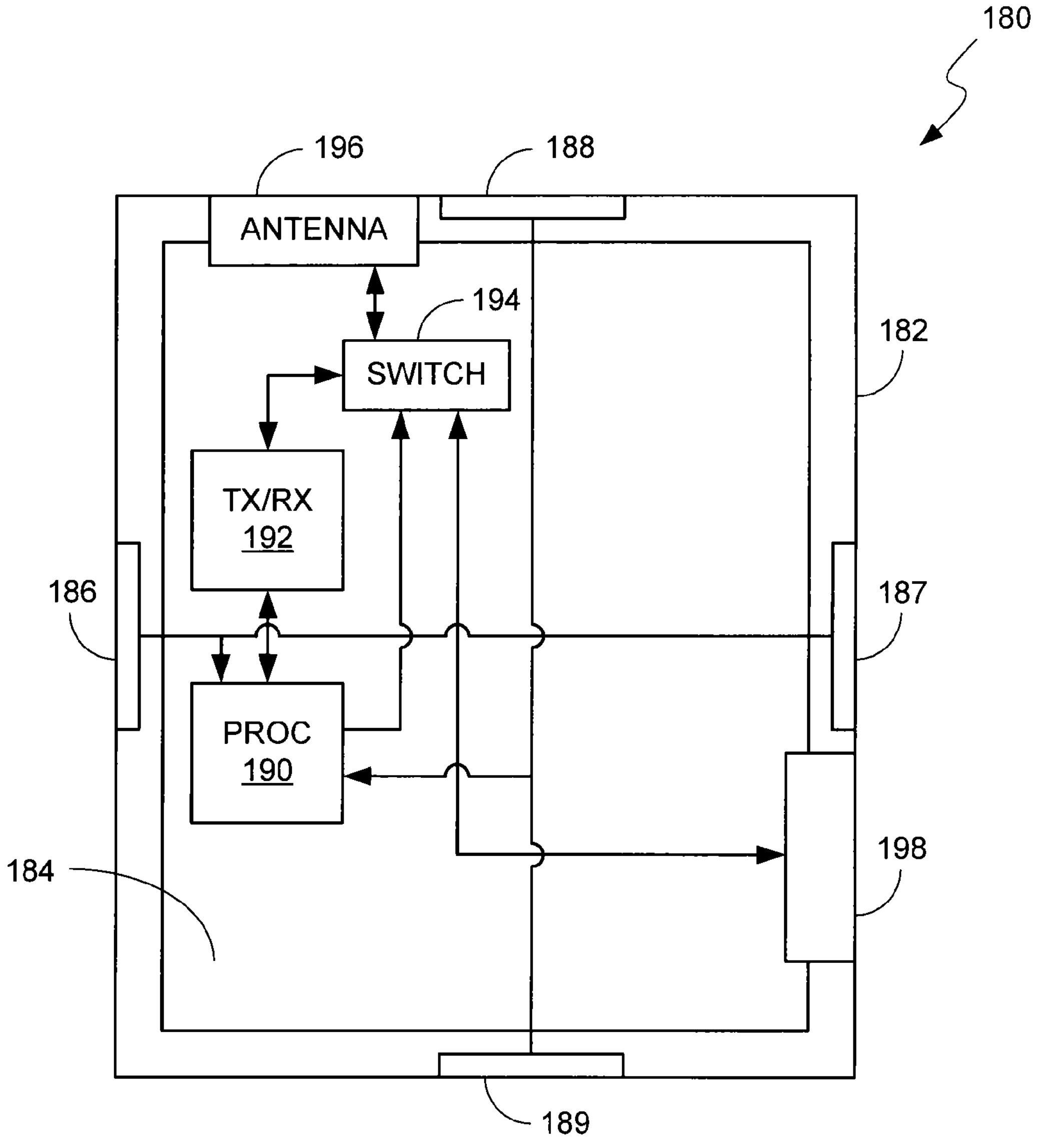
FIG. 5 is a schematic diagram depicting another example embodiment of a device configured as a tablet computer.

FIG. 5 is a schematic diagram depicting another example embodiment of a device, which is configured as a tablet computer. As shown in FIG. 5, device 180 includes a housing 182, which generally forms an encasement for various components (not shown), a display 184, and two pairs of sensors. The first pair incorporates sensors 186, 187, with each of these sensors being positioned at a corresponding opposing side of the housing (i.e., at the left and right sides). The second pair incorporates sensors 188, 189, with each of these sensors being positioned at a corresponding opposing side of the housing (i.e., at the top and bottom sides).

Various types and configurations of sensors can be used. In some embodiments, one or more of the sensors may be a pressure sensor, operative to sense a change in pressure, a capacitive sensor operative to sense a localized change in capacitance, an optical sensor operative to sense a reflected light change in energy, a proximity sensor operative to sense distance change, or a moisture sensor operative to sense a localized change in moisture, among others. In operation, these sensed changes may be correlated with the position of a hand.

Device 180 also incorporates a processor 190, a transceiver 192, a switch 194 and antennas 196, 198, with each of the antennas being located in a vicinity of one of the sensors (e.g., adjacent to a sensor). The sensors communicate with the processor, which communicates with the transceiver and the switch.

Figure 6A:
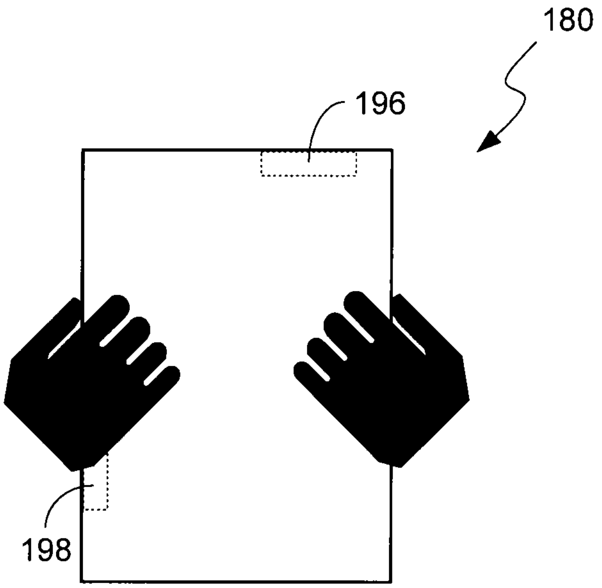
FIGS. 6A and 6B are schematic diagrams depicting the device of FIG. 5.
Figure 6B:
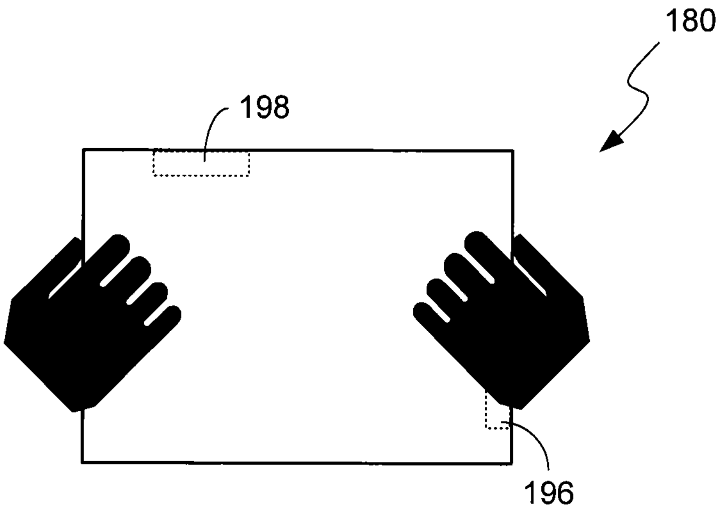

In operation, the sensors provide input (either directly or indirectly) to the processor so that a determination may be made as to whether a hand of a user is currently being detected. Responsive to a determination of the presence of a user's hand, the processor communicates instructions to the switch (i.e., antenna selection system) so that the switch may selectively activate the antenna that is not predicted to be obstructed by the detected hand. For instance, when being use as depicted in FIG. 6A, antenna 196 may be active. Once activated, the selected antenna may interact with the transceiver for transmitting and receiving signals. Actuation of the other antenna may be performed if different sensor inputs are received. By way of example, FIG. 6B depicts antenna 198 as the active antenna responsive to one or both of sensors 188, 189 detecting the presence of the user's hands.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A handheld electronic device comprising:

a housing having a top side, a bottom side, a left side and a right side, wherein each of the sides lies in a unique plane such that no two sides lie in a common plane;

a first antenna mounted at a first position of the housing on a first side;

a second antenna mounted at a second position of the housing on a second side;

a hand position monitoring system operative to determine a position of a hand of a user grasping the housing of the device, wherein the hand position monitoring system comprises a first pair of sensors and a second pair of sensors, each of the sensors of the first pair being positioned at opposing ones of the sides comprising the left side and the right side, each of the sensors of the second pair being positioned at alternate and opposing ones of the sides comprising the top side and the bottom side, wherein one of the first pair of sensors is further positioned on the first side adjacent to the first antenna such that a second of the first pair of sensors is positioned at a side opposing the first antenna, and wherein one of the second pair of sensors is further positioned on the second side adjacent to the second antenna such that a second of the second pair of sensors is positioned at a side opposing the second antenna; and an antenna selection system operative to selectively and alternately activate the first antenna and the second antenna responsive to the hand position monitoring system determining that the hand is in a vicinity of the first antenna or the second antenna, wherein input from either the first sensor or the second sensor of the first pair of sensors causes the antenna selection system to activate the second antenna, and wherein input from either the first sensor or the second sensor of the second pair of sensors causes the antenna selection system to activate the first antenna.

2. The device of claim 1, wherein the first sensor is a pressure sensor.

3. The device of claim 1, wherein the first sensor is a proximity sensor or an optical sensor.

4. The device of claim 1, wherein:

the first antenna is positioned at a first of the sides, and the second antenna is positioned at one of the sides adjacent to the first of the sides.

5. The device of claim 1, wherein the first antenna is mounted to the housing.

6. The device of claim 1, wherein the device is a tablet computer.

7. The device of claim 1, wherein the antenna selection system has a switch coupled to the first antenna and the second antenna, the switch being operative to selectively and alternately activate the first antenna and the second antenna.

8. A method for improving antenna performance of a handheld electronic device having multiple antennas, a top side, a bottom side, a left side and a right side, wherein each of the sides lies in a unique plane such that no two sides lie in a common plane, the method comprising:

monitoring a first pair of sensors and a second pair of sensors, the first pair of sensors being positioned at opposing ones of sides of the device, the second pair of sensors being positioned at alternate and opposing ones of sides of the device, wherein one of the first pair of sensors is further positioned on a first side adjacent to a first antenna such that a second of the first pair of sensors is positioned at a side opposing the first antenna, and wherein one of the second pair of sensors is further positioned on a second side adjacent to a second antenna such that a second of the second pair of sensors is positioned at a side opposing the second antenna;

receiving an input from any sensor among one of the first pair and the second pair to determine a position of a hand of a user of the device, the hand being used to grasp the device; and based on the determination, activating one of the antennas that does not correspond to the position of the hand such that input from either the first sensor or the second sensor of the first pair of sensors causes activation of the second antenna, and wherein input from either the first sensor or the second sensor of the second pair of sensors causes activation of the first antenna.

9. The method of claim 8, wherein using the sensor comprises:

sensing a change in pressure; and correlating the change in pressure with the position of the hand.

10. The method of claim 8, wherein using the sensor comprises:

sensing a localized change in capacitance of the device; and correlating the change in capacitance with the position of the hand.

11. The method of claim 8, using the sensor comprises:

sensing a localized change in moisture; and correlating the change in moisture with the position of the hand.

12. The method of claim 8, wherein using the sensor comprises:

sensing a reflected energy change in light; and correlating the change in light with the position of the hand.

13. The method of claim 8, using the sensor comprises:

sensing a distance change; and correlating the change in distance with the position of the hand.

14. The method of claim 8, wherein:

the device is a tablet computer.

* * * * *